(12) United States Patent  
Frivik et al.

(10) Patent No.: US 9,234,978 B2
(45) Date of Patent: Jan. 12, 2016

(54) METHOD FOR POSITIONING THE FRONT END OF A SEISMIC SPREAD

(75) Inventors: Svein Arne Frivik, Oslo (NO); Vidar A. Husom, Asker (NO)

(73) Assignee: WESTERNGECO L.L.C., Houston, TX (US)

( * ) Notice: Subject to any disclaimer, the term of this patent is extended or adjusted under 35 U.S.C. 154(b) by 596 days.

(21) Appl. No.: 12/706,791

(22) Filed: Feb. 17, 2010

(65) Prior Publication Data

US 2011/0007603 A1  Jan. 13, 2011

Related U.S. Application Data

(60) Provisional application No. 61/223,609, filed on Jul. 7, 2009.

(51) Int. Cl.
*G01V 1/38* (2006.01)

(52) U.S. Cl.
CPC .................... *G01V 1/3835* (2013.01)

(58) Field of Classification Search
CPC .................................................. G01V 1/3835
USPC ........ 342/7, 70, 109, 111, 157; 343/709, 756, 343/911 L; 367/19, 21, 88, 100, 125, 130, 367/16; 114/163, 246, 253
See application file for complete search history.

(56) References Cited

U.S. PATENT DOCUMENTS

| | | | | |
|---|---|---|---|---|
| 2,472,782 | A * | 6/1949 | Albersheim | 342/6 |
| 3,772,692 | A * | 11/1973 | Braddon | 342/41 |
| 3,806,927 | A * | 4/1974 | Lane, Jr. | 342/7 |
| 4,260,991 | A * | 4/1981 | Dachert et al. | 343/756 |
| 4,458,342 | A * | 7/1984 | Tournois | 367/88 |
| 4,573,933 | A | 3/1986 | Cameron | |
| 4,635,236 | A | 1/1987 | Roberts | |
| 4,724,436 | A * | 2/1988 | Johansen et al. | 342/7 |
| 4,890,568 | A * | 1/1990 | Dolengowski | 114/246 |
| 5,031,159 | A * | 7/1991 | Rouquette | 367/125 |
| 5,668,775 | A | 9/1997 | Hatteland | |
| 5,731,778 | A * | 3/1998 | Nakatani et al. | 342/70 |
| 6,009,042 | A | 12/1999 | Workman et al. | |
| 7,315,274 | B2 | 1/2008 | Fossum | |
| 2006/0209634 | A1 * | 9/2006 | Vigen | 367/21 |
| 2008/0048881 | A1 | 2/2008 | Safinya et al. | |

OTHER PUBLICATIONS

Gallman, "Standards & Requirements," 2006, downloaded Mar. 31, 2015 from http://www.theradarreflectorsite.org/StandardsAndRequirements.htm.*
Amazon Warrior, 2015, downloaded Mar. 31, 2015 from http://www.marinetraffic.com/ais/details/ships/shipid:463402/mmsi:372757000/imo:9662394/vessel:AMAZON_WARRIOR.*
PCT Search Report, dated Feb. 24, 2011, Application No. PCT/US2010/041000.
Extended European Search Report of European Application No. 10797692.0 dated Mar. 5, 2014: p. 1-8.
Stelzer, A., Jahn, M., Scheiblhofer, S., "Precise Distance Measurement with Cooperative FMCW Radar Units," Radio and Wireless Symposium Jan. 22-24, 2008: pp. 771-774.
Anonymous, "FMCW—Frequency-modulated continuous-wave-radar," Wikipedia, retrieved Apr. 27, 2012: pp. 1-2.

* cited by examiner

*Primary Examiner* — Daniel L Murphy

(57) ABSTRACT

Systems and methods for determining the position of a buoyancy element in a marine survey are described in which a passive reflecting material is disposed on the buoyancy element to enable a radar on the vessel to detect the position of the buoyancy element. The radar may emit a frequency modulated continuous wave or a sequence of frequency modulated or phase modulated sinusoidal waves.

29 Claims, 4 Drawing Sheets

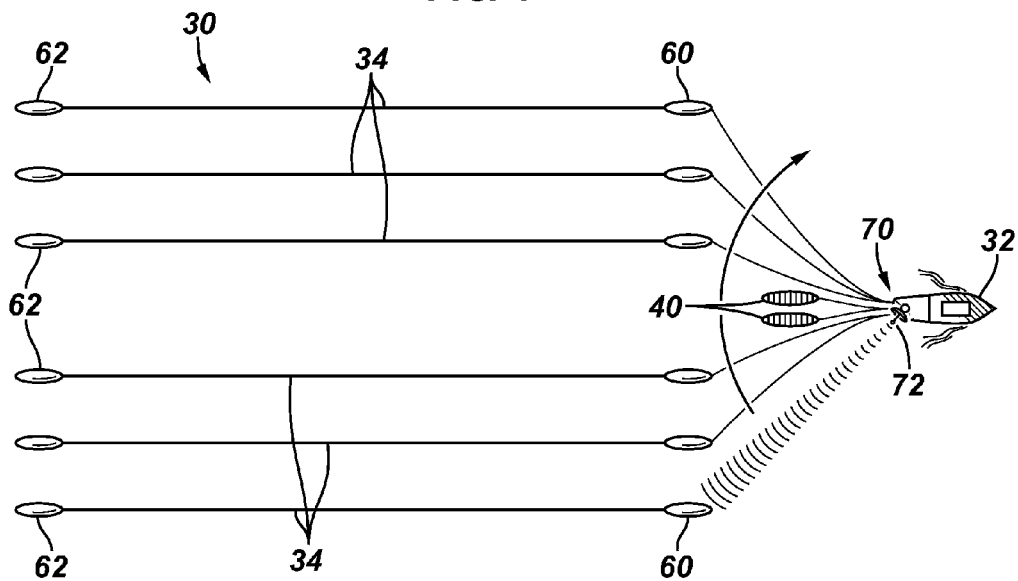
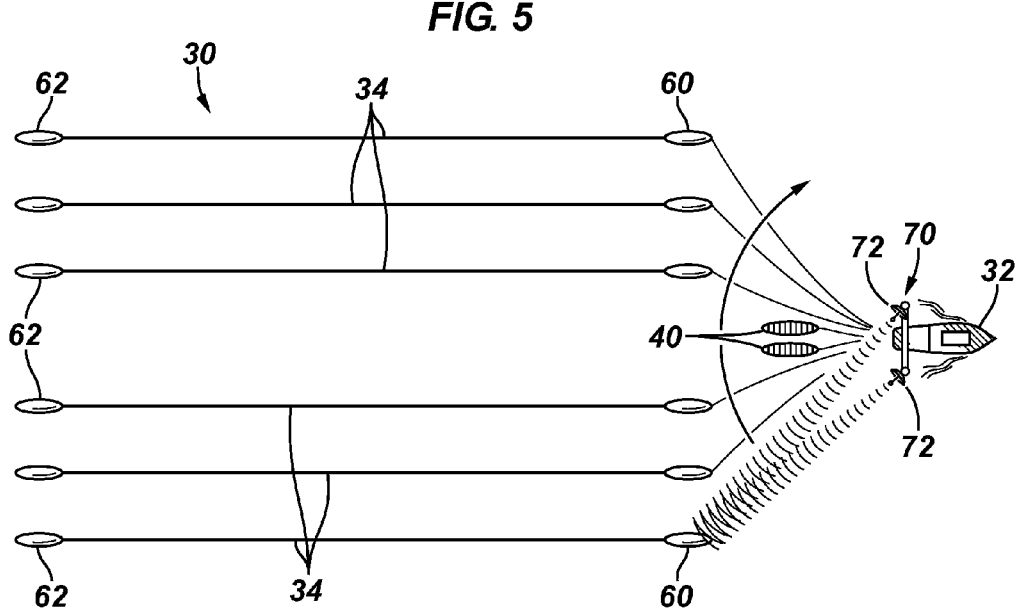

METHOD FOR POSITIONING THE FRONT END OF A SEISMIC SPREAD

CROSS-REFERENCE TO RELATED APPLICATIONS

This application claims the benefit of U.S. Provisional Patent Application No. 61/223,609, filed Jul. 7, 2009.

STATEMENT REGARDING FEDERALLY SPONSORED RESEARCH OR DEVELOPMENT

Not applicable.

BACKGROUND

This disclosure relates to marine seismic data acquisition, and more particularly to technology for positioning a front portion of an array of streamers.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure Changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensors and source(s) is towed behind a survey vessel. The seismic sensors are contained within or on streamers towed by the survey vessel.

In cases where multiple streamers are used for seismic data acquisition, deflector devices (e.g., doors and/or monowings, etc.) are often used to maintain streamer separation. Lead-in devices are then used to connect the vessel to the deflectors. In order to maintain the streamer depth at the front of the array, floats or paravanes are used to get sufficient buoyancy of the front, and hence avoid the front to dive. In order to determine the position of the streamers, GPS units have often been used on the floats or on special dedicated front end positioning floats. These floats are cumbersome and difficult to maintain as they are sitting on the front of the streamers. Furthermore, they require increased mobilization time and hence make the operation less efficient.

Another drawback of having the GPS on the float is that it needs power and such power comes from the lead-in or the streamer as battery power is not sufficient for powering the GPS and its associated communication radio. Since the deflectors are large, and ropes and chains used to connect the paravane and wings are exposed to large forces, it is difficult to maintain electrical wiring from the streamers to the floats. In addition, extra equipment is needed to connect a front end GPS.

U.S. Pat. No. 7,315,274 to Kongsberg Seatex AS discloses a method for determining the position of marine vessels and objects through the use of an interrogator and transponder. The '274 patent describes the use of the transponder for including identity tags into the signal to be reflected to the interrogator. Such method, however, still requires power on the marine objects on which the transponders are positioned.

BRIEF SUMMARY

The present disclosure relates to the art of positioning the front of a seismic spread. In particular, this disclosure describes how to obtain the positions of buoyancy elements (e.g., floats) associated with the seismic spread using high resolution radar technology. Passive reflecting materials are disposed on buoyancy elements such that they can be detected and tracked by the radar system. The system and method disclosed according to one aspect of the present disclosure is thus passive on the float and active on the vessel. The system requires no power on the floats, thus eliminating the need for electrical wiring to/from the floats. In other embodiments, a GPS/radar combination is provided on one of the buoyancy elements instead of the vessel, yet the remaining floats are passive.

Moreover, in the system presently described, there is no need to have identity tags associated with the streamer equipment as it is towed in a specific manner and the relation between the elements prior to positioning them is known. Also, passive tagging may be used to identify streamer equipment. For example, a reflector having known characteristics can be disposed on the streamer equipment, thus permitting decoding to identify the particular marine equipment (e.g., buoy).

BRIEF DESCRIPTION OF THE DRAWINGS

FIG. 4 is a top view of the seismic spread of FIG. 1 further illustrating a radar system for use in positioning the seismic spread according to the present disclosure.

FIG. 5 is a top view of the seismic spread of FIG. 1 illustrating another embodiment of a radar system for use in positioning the seismic spread according to the present disclosure.

DETAILED DESCRIPTION

Figure 1:
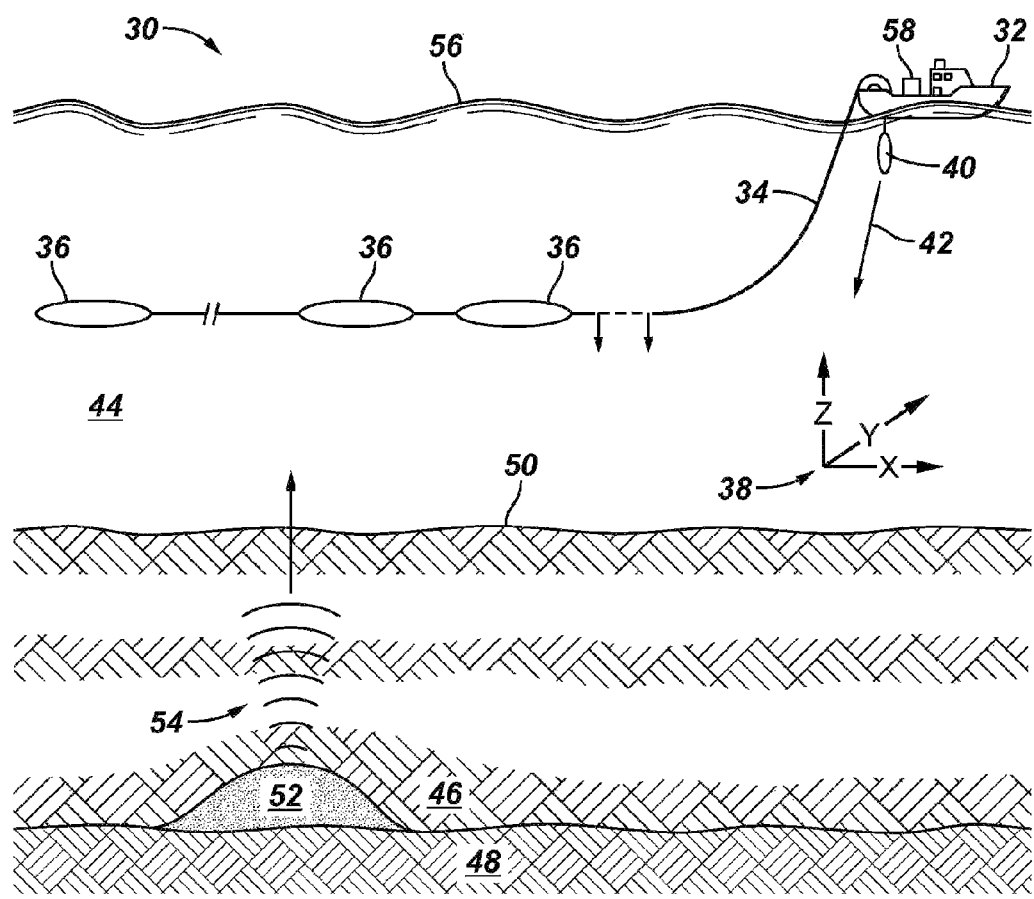
FIG. 1 is a schematic diagram of a marine seismic data acquisition system according to one embodiment of the present disclosure.

FIG. 1 depicts an embodiment 30 of a marine seismic data acquisition system in accordance with some embodiments of the disclosure. In the system 30, a survey vessel 32 tows one or more seismic streamers 34 (one exemplary streamer 34 being depicted in FIG. 1) behind the vessel 32. The seismic streamers 34 may be several thousand meters long and may contain various support cables (not shown), as well as wiring and/or circuitry (not shown) that may be used to support communication along the streamers 34. In general, each streamer 30 includes a primary cable into which is mounted seismic sensors 36 that record seismic signals. It is to be appreciated that the sensors 36 are illustrated schematically for emphasis in FIG. 1, and that in practice, the sensors 36 are disposed within the streamer cable 34.

In accordance with embodiments of the disclosure, the seismic sensors 36 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 38, for example)) of a particle velocity and one or more components of a particle acceleration.

Depending on the particular embodiment of the disclosure, the multi-component seismic sensor may include one or more hydrophones, geophones, particle displacement sensors, particle velocity sensors, accelerometers, pressure gradient sensors, or combinations thereof.

For example, in accordance with some embodiments of the disclosure, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic data acquisition system 10 includes a seismic source 40 that may be formed from one or more seismic source elements, such as air guns, for example, which are connected to the survey vessel 32. Alternatively, in other embodiments of the disclosure, the seismic source 40 may operate independently of the survey vessel 32, in that the seismic source 40 may be coupled to other vessels or buoys, as just a few examples.

As the seismic streamers 34 are towed behind the survey vessel 32, acoustic signals 42 (an exemplary acoustic signal 42 being depicted in FIG. 1), often referred to as "shots," are produced by the seismic source 40 and are directed down through a water column 44 into strata 46 and 48 beneath a water bottom surface 50. The acoustic signals 42 are reflected from the various subterranean geological formations, such as an exemplary formation 52 that is depicted in FIG. 1.

The incident acoustic signals 42 that are acquired by the sources 40 produce corresponding reflected acoustic signals, or pressure waves 54, which are sensed by the seismic sensors 36. It is noted that the pressure waves that are received and sensed by the seismic sensors 36 include "up going" pressure waves that propagate to the sensors 36 without reflection, as well as "down going" pressure waves that are produced by reflections of the pressure waves 54 from an air-water boundary 56.

The seismic sensors 36 generate signals (digital signals, for example), called "traces," which indicate the acquired measurements of the pressure wavefield and particle motion (if the sensors are particle motion sensors). The traces are recorded and may be at least partially processed by a signal processing unit 58 that is deployed on the survey vessel 32, in accordance with some embodiments of the disclosure. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 52. Subsequent analysis of the representation may reveal probable locations of hydrocarbon deposits in subterranean geological formations. Depending on the particular embodiment of the disclosure, portions of the analysis of the representation may be performed on the seismic survey vessel 32, such as by the signal processing unit 58.

Figure 2:
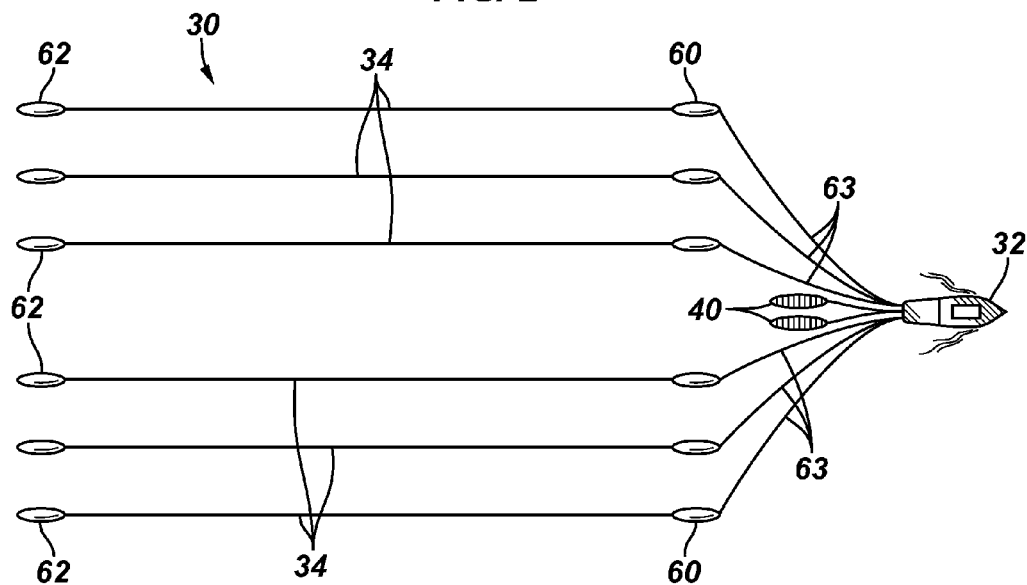
FIG. 2 is a top view of the seismic spread of FIG. 1 further illustrating multiple streamers connected between front floats and tail buoys.
Figure 3:
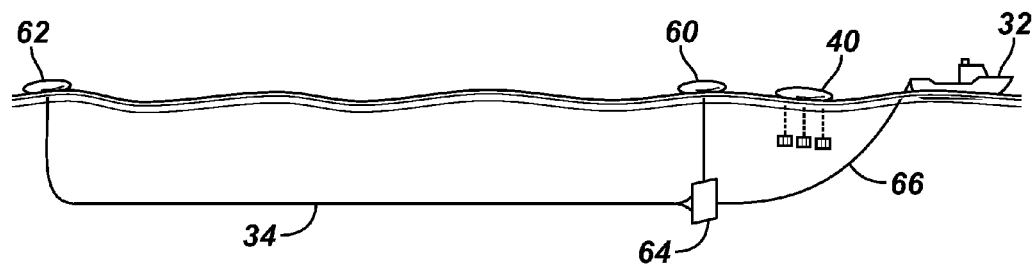
FIG. 3 is a side view of one streamer of FIG. 2 further illustrating a deflector device.

Referring to FIG. 2, the seismic spread 30 includes one or more streamers 34 operatively connected to one or more front floats 60 and tail buoys 62, which impart buoyancy to the spread 30. The front floats 60 are operatively connected to the survey vessel 32 by lead-in cables 63. In some embodiments, the front float 60 is operatively connected to a deflector device 64 (FIG. 3), which is operatively connected to the vessel 32 via a tow line 66. The deflector device 64 is generally used to maintain separation between the streamers 34 of the spread 30. It is to be appreciated that the deflector device 64 may take on a variety of embodiments. For example, the deflector device 64 may be a wing-shaped body that can induce a sideways lateral force to thus urge the tow line 66 in a lateral direction relative to the direction of movement of the survey vessel 32. In other embodiments, the deflector device 64 may be a fixed angle deflector device, e.g., the kind referred to as a "door."

Referring to FIGS. 4 and 5, according to the principles of the present disclosure, a high-resolution broadband radar system 70, such as continuous wave radar technology, can be used to track the position of the front floats 60 and/or tail buoys of a seismic spread 30, thus eliminating the need to provide a GPS (or other GNSS technology) on such floats and buoys. Radar technology has recently evolved from a simple pulse system into continuous wave (CW) radars. One implementation of continuous wave radars is a frequency modulated, continuous wave radar (FM-CW). In FM-CW systems, the emitted signal is not a continuous fixed frequency, but rather one that sweeps up and down over a fixed period of time. By comparing the frequency of the received signal to one currently being sent, the difference in frequency can be accurately measured, and thus used to determine distance (also called range). Additional details regarding FM-CW technology can be found in the following references, which are hereby incorporated by reference: "Precise Distance Measurement with Cooperative FMCW Radar Units," Stelzer, A., Jahn, M., Scheiblhofer, S., Kepler University of Linz, Radio and Wireless Symposium, 2008 IEEE (January 2008); "Theory of FMCW Radar Waveforms," 2003, www.its.bldrdoc.gov.

Other radar technology is contemplated as falling within the scope of the present disclosure. For example, pulse compression radar technology may be used to achieve similar resolution as FM-CW technology. Pulse compression is a signal processing technique that generally involves modulating a transmitted pulse and then correlating the received signal with the transmitted pulse. One example of a pulse compression radar that can be used according to the present disclosure is the X-Band version of the SharpEye™ pulse compression radar offered by Kelvin Hughes. By utilizing pulse compression technology, existing ship radar may be used to transmit signals, thus eliminating the need to provide add-on radar for positioning of the marine seismic equipment (e.g., front floats 60 and tail buoys 62).

In one embodiment, the present disclosure contemplates use of high-resolution broadband radar technology, such as FM-CW or pulse compression, mounted on the vessel 32 (e.g., on the aft of the vessel) and pointing to the front floats 60 towed behind the vessel. In cases of using pulse compression radar, existing ship radar may be utilized. Rather than using GPS units on the front floats 60, a passive radar reflecting material may be disposed on the front floats, thus making the floats visible to and trackable by the radar system 70. Various types of passive radar reflecting material are contemplated as falling within the scope of this disclosure. For example, metallic material, such as metallic bars, or a similar arrangement is contemplated.

The radar system 70 includes one or more radars 72 mounted on the vessel 32. In some embodiments, the radar 72 is mounted on the aft of the vessel. In other embodiments, the radar 72 is mounted on the bridge of the vessel. In FM-CW embodiments, the radars 72 according to the present disclosure differ from conventional ship mounted radars by having better angular accuracy and better range accuracy in order to position the floats. However, as discussed above, pulse compression technology may be used with conventional ship mounted radars. In embodiments where only a single radar 72 is used (FIG. 4), the positioning data returning to the radar receiver is beam formed such that several travel times and angular measurements of the floats are taken. In other embodiments, two or more radars 72 can be used to determine the position of the different front-end floats 60 used in the seismic spread 30. FIG. 5, for example, illustrates one principle where two beams emitted from two radars 72 are pointing in the direction of one front float 60. With the current technology, several beams and beam widths can be chosen dependent on the radar aperture. Two or more synchronized radars or an ultra-high-resolution radar with sufficient aperture can be used. In one embodiment, the position of the radar 72 is surveyed using real-time kinematic (RTK) GPS with high accuracy.

In practice, the radar 72 on the vessel transmits a pulse continuous wave generally towards the sea, and more specifically towards the front floats 60. The transmitted signal hits the passive reflecting material and is returned back to the receiving antenna of the radar 72. It is not necessary to have tagged the particular equipment as the streamer equipment is towed in a specific manner and the relation between the elements prior to positioning them is known. However, in some instances, passive tagging may be employed. For example, a reflector having known characteristics (e.g., a characteristic such as material property that is distinguishable from other reflectors) can be disposed on the streamer equipment, thus permitting decoding to identify the particular marine equipment.

The returned signal is then processed to obtain a radar image. In some embodiments, processing of the signal may take place on a processor associated with the radar 72, while in other embodiments, processing may take place on a processor provided separately from the radar 72. For example, the received signal may be converted into a video signal and processed separately in a separate unit. Processing may be optimized to avoid sea effects (wave), rain, and other disturbances affecting movement of the float 60. Range and bearing can thus be determined and the changes in range and bearing are used to track the float 60. In practice, the range and bearing is related to a geographical coordinate reference typically obtained from a vessel global navigation satellite system (GNSS), such as GPS.

Figure 6:
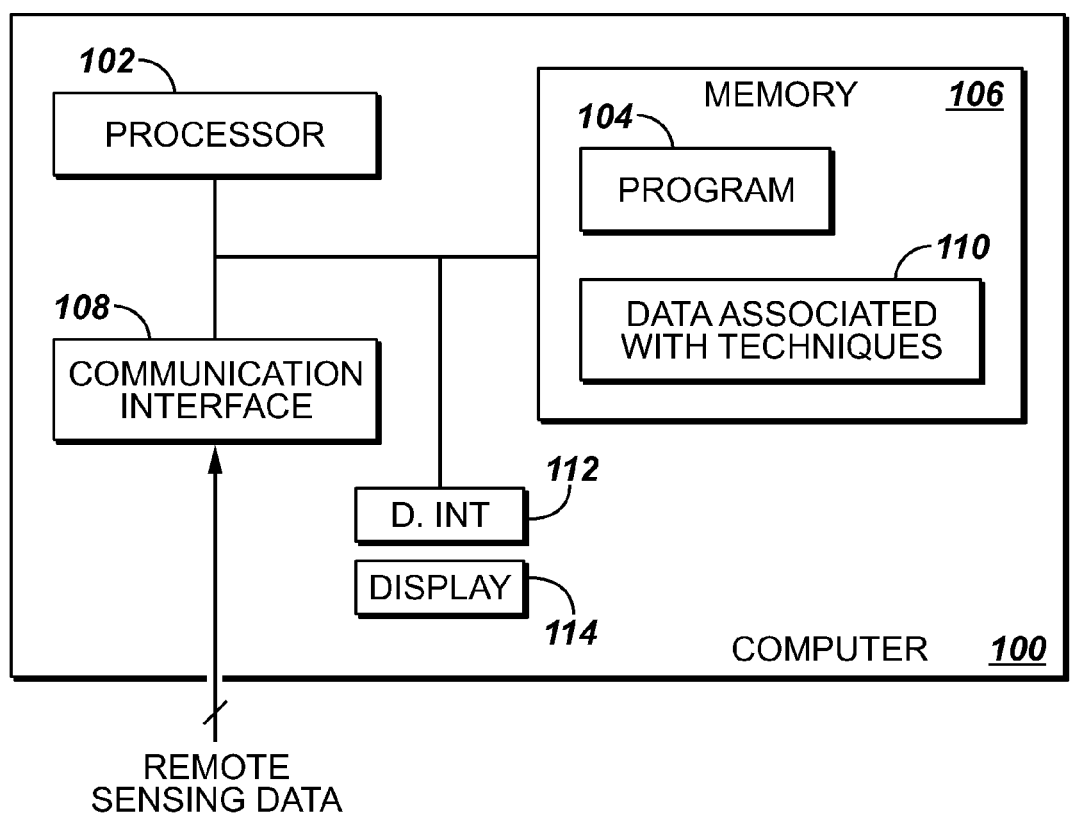
FIG. 6 is a schematic diagram of a data processing system for carrying out processing techniques according to the present disclosure.

Referring to FIG. 6, in accordance with some embodiments of the present disclosure, a data processing system 100 may include a processor 102 that is constructed to execute at least one program 104 (stored in a memory 106) for purposes of processing data to perform one or more of the techniques that are disclosed herein (e.g., processing the signal data reflected from the buoyancy elements). The processor 102 may be coupled to a communication interface 108 for purposes of receiving data at the vessel 32. In addition to storing instructions for the program 104, the memory 106 may store preliminary, intermediate and final datasets involved in the techniques (data associated with techniques 110) that are disclosed herein. Among its other features, the data processing system 100 may include a display interface 112 and display 114 for purposes of displaying the various data that is generated as described herein.

Once the position of the float 60 is known relative to the radar 72, the position of the seismic sensors, e.g. sensor 36, may be determined using acoustic positioning. One example of acoustic positioning is taught by U.S. Pat. No. 5,668,775 to Hatteland, which is incorporated herein by reference. GPS (or similar GNSS technology) may then be used to map the seismic sensor 36 to its true geographical position. In this manner, the position of the sensor 36 can be correlated to the firing of the source 40. Thus, according to the present disclosure, use of the radar 72 determines ranges to the floats 60, which are passive (i.e., no power source is required on or to the float 60), thereby determining the positions of the floats 60. By knowing the relative positions of the floats 60, the vessel 32 and acoustics associated with the streamer 34, the positions of the sensors 36 can be determined.

In addition to positioning the front of the streamers 34, the principles of the present disclosure can also be applied to positioning the source 40. In such embodiments, a passive reflecting material may be applied to the source float, either as a coating or along certain points.

While the present disclosure has been described with respect to a limited number of embodiments, those skilled in the art, having the benefit of this disclosure, will appreciate numerous modifications and variations therefrom. For example, in some embodiments, a GPS (or similar GNSS technology) may be placed on the tail buoys 62 to provide a further reference point. Also, it is to be appreciated that acoustic positioning may be accomplished with acoustics disposed on or in the streamer, as well as with acoustics disposed on other components of the seismic spread. Still further, the systems and methods of the present disclosure may be used to track the position of any buoyancy element associated with the seismic spread 30, including not only the front floats 60 and tail buoys 62, but also paravanes, source floats, monowing floats, door floats and mid-streamer positioning floats. Thus, any such buoyancy element associated with the seismic spread 30 may have a passive radar reflecting material disposed thereon to facilitate positioning of such buoyancy element according to the present disclosure.

In some embodiments, the radar 72 may be positioned apart from the vessel 32 and rather on other seismic equipment forming part of the seismic spread 30. For example, the GPS (or similar GNSS technology) used in the methods of this disclosure may be positioned together with the radar 72 on the source 40. Alternatively, the GPS and radar combination may be provided on one of the front floats 60. More generally speaking, the GPS and radar combination may be provided on any buoyancy element associated with the seismic spread 30 and used to position other buoyancy elements of the seismic spread.

It is intended that the appended claims cover all such modifications and variations as falling within the true spirit and scope of this present disclosure.

What is claimed is:

1. A seismic spread, comprising:
   a vessel having a first radar disposed thereon;
   a seismic streamer coupled to the vessel; and
   a buoyancy element disposed at a front end of the seismic spread and coupled to the seismic streamer, the buoyancy element having a passive radar reflecting material disposed thereon that is configured for detection by the first radar.

2. The seismic spread according to claim 1, wherein the first radar is capable of transmitting a frequency modulated, continuous wave.

3. The seismic spread according to claim 1, wherein the first radar is capable of transmitting a sequence of frequency modulated or phase modulated sinusoidal waves.

4. The seismic spread according to claim 1, wherein the buoyancy element is a front float, a source float, a paravane, a monowing float, or a door float.

5. The seismic spread according to claim 1, wherein the passive radar reflecting material has a characteristic configured to be used by the first radar to identify the buoyancy element.

6. The seismic spread according to claim 5, wherein the characteristic is a material property of the passive radar reflecting material that is distinguishable from reflectors on other buoyancy elements coupled to the seismic streamer.

7. The seismic spread according to claim 1, wherein the vessel has a second radar disposed thereon and wherein the second radar is synchronized with the first radar for emitting beams in the direction of the buoyancy element.

8. The seismic spread according to claim 1, wherein:
   the buoyancy element comprises a first buoyancy element and the passive radar reflecting material comprises a first passive radar reflecting material having a first reflective characteristic, and
   the seismic spread comprises a second buoyancy element coupled to the seismic streamer, the second buoyancy element comprises a second passive radar reflecting material disposed thereon that is configured for detection by the first radar, wherein the second reflecting material comprises a second reflective characteristic that is distinguishable from the first reflective characteristic of the first reflecting material, and the second passive radar reflecting material is used to track a position of the second buoyancy element for positioning the second buoyancy element relative to the first buoyancy element.

9. The seismic spread according to claim 1, wherein:
   the seismic streamer comprises a first seismic streamer, the buoyancy element comprises a first buoyancy element, and the passive radar reflecting material comprises a first passive radar reflecting material having a first reflective characteristic,
   the seismic spread comprises a second seismic streamer coupled to the vessel, and
   the seismic spread comprises a second buoyancy element disposed at the front end of the seismic spread and coupled to a front end of the second seismic streamer, the second buoyancy element comprises a second passive radar reflecting material disposed thereon that is configured for detection by the first radar, the second reflecting material comprises a second reflective characteristic that is distinguishable from the first reflective characteristic of the first reflecting material, and the second passive radar reflecting material is used to track a position of the second buoyancy element for positioning the second buoyancy element relative to the first buoyancy element.

10. The seismic spread according to claim 1, wherein:
    the vessel comprises a second radar disposed thereon, the second radar being separate from the first radar, and
    the first and second radars are used to separately track the position of the buoyancy element and of the front end of the seismic spread for positioning the buoyancy element and the front end of the seismic spread.

11. The seismic spread according to claim 10, wherein:
    the first radar is mounted to the vessel at a first location on the vessel,
    the second radar is mounted to the vessel at a second location on the vessel, and
    the second location on the vessel is different than the first location on the vessel.

12. A system for positioning a buoyancy element of a seismic spread, comprising:
    a radar disposed on a vessel associated with the seismic spread, wherein the radar is configured to transmit a frequency modulated, continuous wave; and
    a passive radar reflecting material disposed on the buoyancy element, wherein the buoyancy element is a front float coupled to a seismic streamer in the seismic spread; and
    wherein the radar is configured to determine the position of the front end of the seismic spread using the passive radar reflecting material.

13. The system according to claim 12, wherein the radar is configured to detect the bearing of the buoyancy element based on radar signals reflected from the passive radar reflecting material.

14. A method for positioning at least a portion of a seismic spread, comprising:
    using a vessel to tow one or more seismic streamers, the vessel having a GNSS device, a respective seismic streamer being coupled to at least one buoyancy element, and the at least one buoyancy element having a passive radar reflecting material disposed thereon, and wherein the at least one buoyancy element is disposed at the front end of the seismic spread;
    transmitting signals from a radar on the vessel, the signals being reflected from the at least one buoyancy element via the passive radar reflecting material;
    receiving the reflected signals at the vessel; and
    associating the reflected signals with a geographical coordinate reference provided by the GNSS device to determine a reference position of the at least one buoyancy element.

15. The method according to claim 14, wherein transmitting signals from the radar on the vessel comprises transmitting a frequency modulated continuous wave.

16. The method according to claim 14, wherein transmitting signals from the radar on the vessel comprises transmitting a sequence of frequency modulated or phase modulated sinusoidal waves.

17. The method according to claim 14, further comprising using the reference position of the at least one buoyancy element to determine a reference position of at least one seismic sensor disposed on at least one of the seismic streamers.

18. The method of claim 14, further comprising identifying the at least one buoyancy element based on the reflected signals and a characteristic of the passive radar reflecting material.

19. A method for positioning at least a portion of a seismic spread, comprising:
  disposing a passive radar reflecting material on a buoyancy element coupled to a front end of a seismic streamer towed by a vessel;
  mounting one or more radars on the vessel; and
  using at least one of the radars to determine the position of the buoyancy element based on signals that are reflected from the passive radar reflecting material.

20. The method according to claim 19, wherein the one or more radars transmit a frequency modulated continuous wave.

21. The method according to claim 19, wherein the one or more radars transmit a sequence of frequency modulated or phase modulated sinusoidal waves.

22. The method according to claim 19, wherein using at least one of the radars comprises emitting beams from at least one of the radars in the direction of the buoyancy element to detect the passive radar reflecting material.

23. The method according to claim 19, wherein using at least one of the radars further comprises processing the reflected signal to obtain range and bearing of the buoyancy element.

24. The method according to claim 19, wherein the streamer comprises one or more sensors, and further comprising using the position of the buoyancy element to determine the position of the one or more sensors.

25. The method according to claim 19, wherein the passive radar reflecting material has at least one known characteristic, and further comprising identifying the buoyancy element based on the at least one known characteristic.

26. The method of claim 19, further comprising tracking the change in bearing of the buoyancy element using at least one of the radars.

27. The method of claim 19, further comprising tracking the position of the front end of the seismic streamer using at least one of the radars.

28. The method of claim 27, wherein tracking the position of the front end of the seismic streamer comprises tracking the change in range between the buoyancy element and at least one of the radars.

29. A method for positioning at least a portion of a seismic spread, comprising:
  mounting a radar and a GNSS device on a buoyancy element associated with the seismic spread, wherein the buoyancy element is coupled to a front end of a seismic streamer within the seismic spread;
  disposing a passive radar reflecting material on at least one other buoyancy element associated with the seismic spread; and
  using the radar, the GNSS device and the passive radar reflecting material to track a position of the at least one other buoyancy element and to position the at least one other buoyancy element relative to the buoyancy element coupled to the front end of the seismic streamer.

* * * * *